United States Patent [19]

Kodama et al.

[11] 4,291,306

[45] Sep. 22, 1981

[54] FIGURE DISPLAYING DEVICE

[75] Inventors: Kazuyuki Kodama, Kokubunji; Kunihiro Okada, Hinode; Takakazu Huno, Tachikawa; Takeyuki Endo, Hinode; Yasutaka Shibuya, Tachikawa, all of Japan

[73] Assignee: Hitachi, Ltd., Tokyo, Japan

[21] Appl. No.: 96,682

[22] Filed: Nov. 23, 1979

[30] Foreign Application Priority Data

Dec. 4, 1978 [JP] Japan ................................ 53-149104

[51] Int. Cl.³ ............................................. G06F 3/153
[52] U.S. Cl. .................................. 340/744; 340/701; 340/750; 340/799
[58] Field of Search ................ 340/744, 750, 799, 800

[56] References Cited

U.S. PATENT DOCUMENTS 3,293,614  12/1966  Fenimore et al. ............. 340/800 X
3,836,902  9/1974  Okuda et al. .................. 340/800 X
4,026,555  5/1977  Kirschner et al. ............. 340/799 X Primary Examiner—David L. Trafton
Attorney, Agent, or Firm—Craig and Antonelli

[57] ABSTRACT

Herein disclosed is a figure displaying device for producing and displaying a figure on a raster scan television. The figure displaying device includes first memory means for storing the vertical and horizontal coordinate values of the stop information of one frame to be displayed and second memory means for storing preset information. Further inclusive is control means for locating such dot information having a vertical coordinate value corresponding to the vertical scan of the television from the first memory means so that the dot information may be stored at the address of the second memory means corresponding to the horizontal coordinate value of the dot information located.

4 Claims, 10 Drawing Figures

FIGURE DISPLAYING DEVICE

BACKGROUND OF THE INVENTION

1. Field of the Invention

The present invention relates to a figure displaying device for displaying dot information in a raster scan television on the basis of the data fed out of a computer, and more particularly to a visual scene display to be attached to a simulator for pilot training by computer generated imagery (CGI) technology.

2. Description of the Prior Art

In a color visual scene display according to the prior art, in case the information fed out of a computer is displayed in a raster scan television, the so-called "frame memory system," in which there is provided a frame memory having a capacity of (the whole number of picture elements)×(the number of available colors), has heretofore been used because there is a time limit in constructing the screen of the raster scan television. However, the frame memory system has a drawback in that the memory capacity is increased to a remarkable level as the resolution of the screen is improved and as the number of available colors is increased. In case, moreover, such dynamic scenes as have their frames changed each 33 milli-seconds are to be displayed, the writing and reading operations are alternately repeated such that the information from the computer is being written in one frame memory while the previous written information is read out of another frame memory so that it is displayed. As a result, it becomes necessary to provide two sets of the aforementioned frame memories. This provision is accompanied by the further increase in the memory capacity.

In the simulator for pilot training, for instance, it is important that light points are displayed to simulate the night flights. The use of the aforementioned frame memory system with a view to displaying such dot information is markedly uneconomical.

SUMMARY OF THE INVENTION

It is therefore an object of the present invention to provide a figure displaying device which can remarkably reduce, in comparison with the conventional system, the memory capacity necessary for displaying the dot information.

In order to attain the above object, the present invention is featured by the fact that there is provided a first memory for storing the coordinate positions and conditions of the respective dots of one frame, which are fed out of a computer, upon a monitor screen, that the dot information having an ordinate value corresponding to the desired vertical scanning position of a monitor is sorted from the dot information stored in the first memory so that the dot is stored in such an address of a second memory corresponding to the conditions of the dot information located as is designated by the abscissa value of said dot information, that the storage of the second memory is read out in synchronism with the horizontal scanning operation of the monitor and is displayed in the monitor while being colored in accordance with the display priority, and that the locations of the first memory and the writing and reading operations of the second memory are repeated in accordance with the vertical scanning operation of the monitor thereby to form an image of the one frame.

DESCRIPTION OF THE PREFERRED EMBODIMENTS

Figure 7:
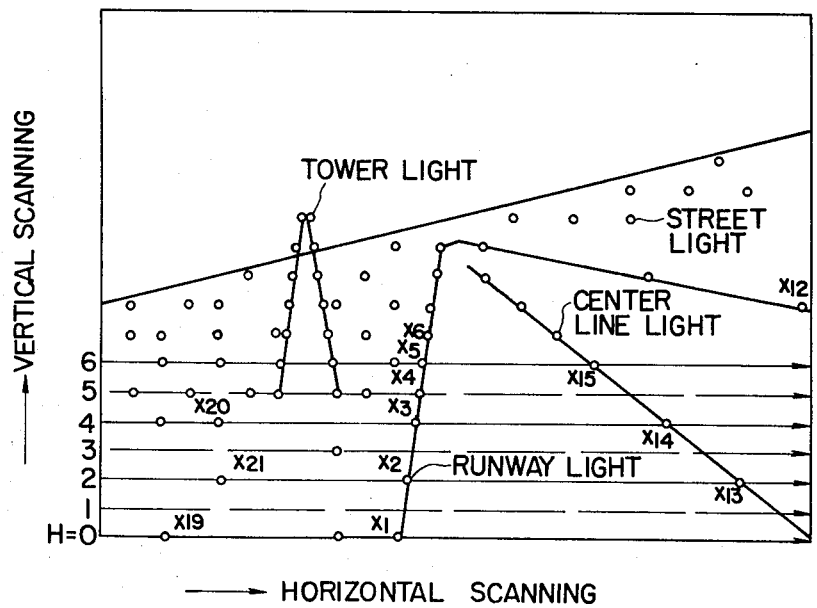
FIG. 7 is also a diagrammaticaly view showing one example of the scene of a visual scene display.

With reference to FIGS. 1 to 4 showing one embodiment of a figure displaying device according to the present invention, description will now be made of the example, by which 512 dots, at the maximum, having four separate colors are displayed by television (shown in FIG. 7) having a resolution of 1024 (in the horizontal direction)×512 (in the vertical direction).

In FIGS. 1 to 4, letters RAM indicate a random access memory, SEL a data selector, CNT a binary counter, CMP a comparator, LAT a latch register, TFF a T type flip-flop, DEC a decoder, SR a shift register, PE a priority encoder, DAC a digital-to-analog converter (or DA converter), NAND a NAND gate, AND an AND gate, NOR a NOR gate, OR an OR gate, and INV an inverter.

The random access memory RAM is made operative to perform both a writing operation by receiving at its input terminal DI the data to be written, by designating at its address terminal ADR the address to be written or read and by receiving the value "0" at its chip select terminal CS and at its write enable terminal WE and a reading operation of the data from its data output terminal D0 by receiving the value "0" at its chip select terminal CS and the value "1" at its write enable terminal WE.

Figure 1:
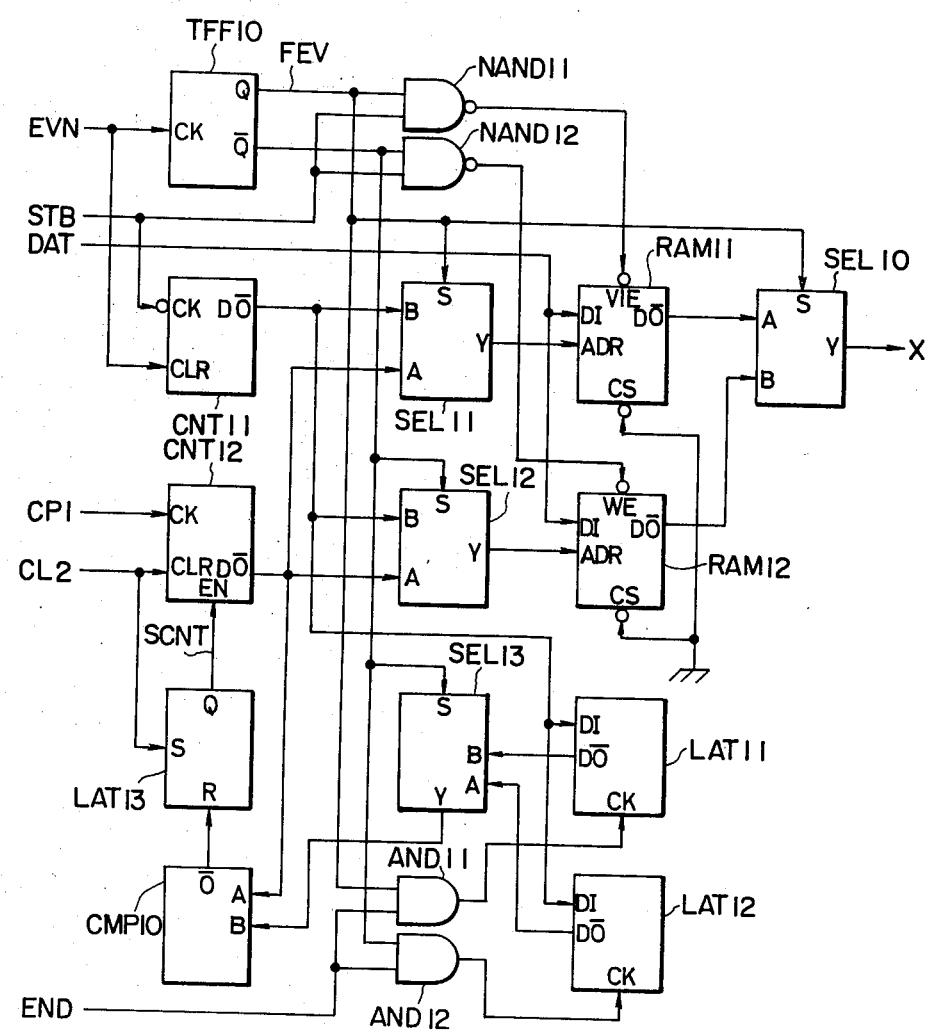
FIGS. 1 to 3 are block diagrams showing one embodiment of a figure displaying device according to the present invention.

FIG. 1 is a block diagram showing the construction of a circuit partly for writing in a random access memory RAM 11 or 12 the data composed of the ordinate and abscissa values and the name (which corresponds specifically to a color) of a dot and partly for reading out of the random access memory RAM 11 or 12 the number of the dots i.e., data written. In order to display the dynamic scenes, in this instance, the two memories (i.e., the RAM 11 and 12) are provided and are interchanged for the writing and reading operations of the data DAT for each frame of the television. Since, moreover, the number of the dots to be displayed for one frame is varied, the selector SEL 13, the LATs 11 to 13 and the CMP 10 are used to constitute a read data number control circuit for reading out of the RAMs the number of the dots which are written one frame before.

Figure 6:
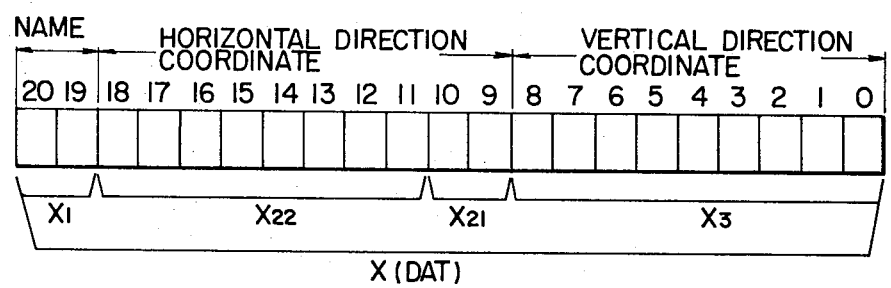
FIG. 6 is a diagrammatical view showing one example of the bit construction of the data per one word, which are fed to the figure displaying device according to the present invention.

The operations of the circuit of FIG. 1 will be described with reference to the timing chart of FIG. 8. At the beginning of the frame of the television, the synchronous signal thereof (i.e., an even field signal) is fed to the clock input terminal CK of an flip-flop 10 so that the output Q thereof, i.e., the signal FEV assumes a level "1." In this frame, therefore, the output of a counter CNT 11 is selected as the address input of the memory RAM 11 by a selector SEL 11. The data DAT fed from a computer or the like are composed of one word and 21 bits, as shown in FIG. 6. The data DAT are sequentially written in accordance with the strobe STB from the computer from the 0 address to the 511 address. at the highest, of the memory RAM 11 (because the capacity of the memory RAMs 11 and 12 is 21 bits×512 words). When the transmission of the data of the dot number to be displayed in the next television is completed at $N_1 (N_1 \leq 512)$, then a transmission completion signal END is generated from the computer or the like so that the output of the counter CNT 11, i.e., the data $N_1$ is stored in the latch 11.

When the dot information fed from the computer or the like is shifted to the next frame so that synchronous signal EVN is fed to the clock input terminal CK, the output thereof reverses its conditions such that the output terminal Q assumes the level "0" whereas the output terminal $\overline{Q}$ assumes the level "1." In this frame, therefore, the selectors SELs 11, 12, 13 and 10 the data outputs D0 of the counter CNTs 12 and 11, the latch LAT 11 and the memory RAM 11. In other words, the data DAT is written in the memory RAM 12, and the number thereof transmitted in this frame from the computer is stored in the latch LAT 12. On the other hand, the storage of the memory RAM 11, which is written in the previous frame, is repeatedly read out from the 0 address to the $N_1$th address for each horizontal scanning period of the television so that it is converted into data X. Incidentally, the counter CNT 12 is cleared by a clear signal CL 2 at the beginning of the horizontal scanning operation and is counted by the clock pulses $CP_1$ of 10 MHz. If, in this instance, the output of the counter CNT 12 becomes coincident with the content $N_1$ of the latch LAT 11, the comparator 10 generates a signal at its output terminal $\overline{O}$ to reset the latch LAT 13, and the counter 12 stops counting, until the next horizontal scanning period is reached, so that the number of the data to be read is restricted.

Likewise, for each frame, the memory RAMs 11 and 12 repeat the writing and reading operations of the data DAT.

As has been described and hereinbefore, the dot information X fed out of the computer and stored in the memory RAM 11 or 12 is made to have the bit construction for each word, as shown in FIG. 6. However, there is no relationship between the feeding order of the data (or word) from the computer and the position of the dots on the television. In order to display the dot information at a high speed in synchronism with the horizontal scanning operation (HSYNC) of the television, therefore, the dot belonging to the horizontal scanning line has to be located in advance from the memory RAM 11 or 12 and assigned in another memory having the capacity corresponding to one horizontal scanning line.

Figure 2:
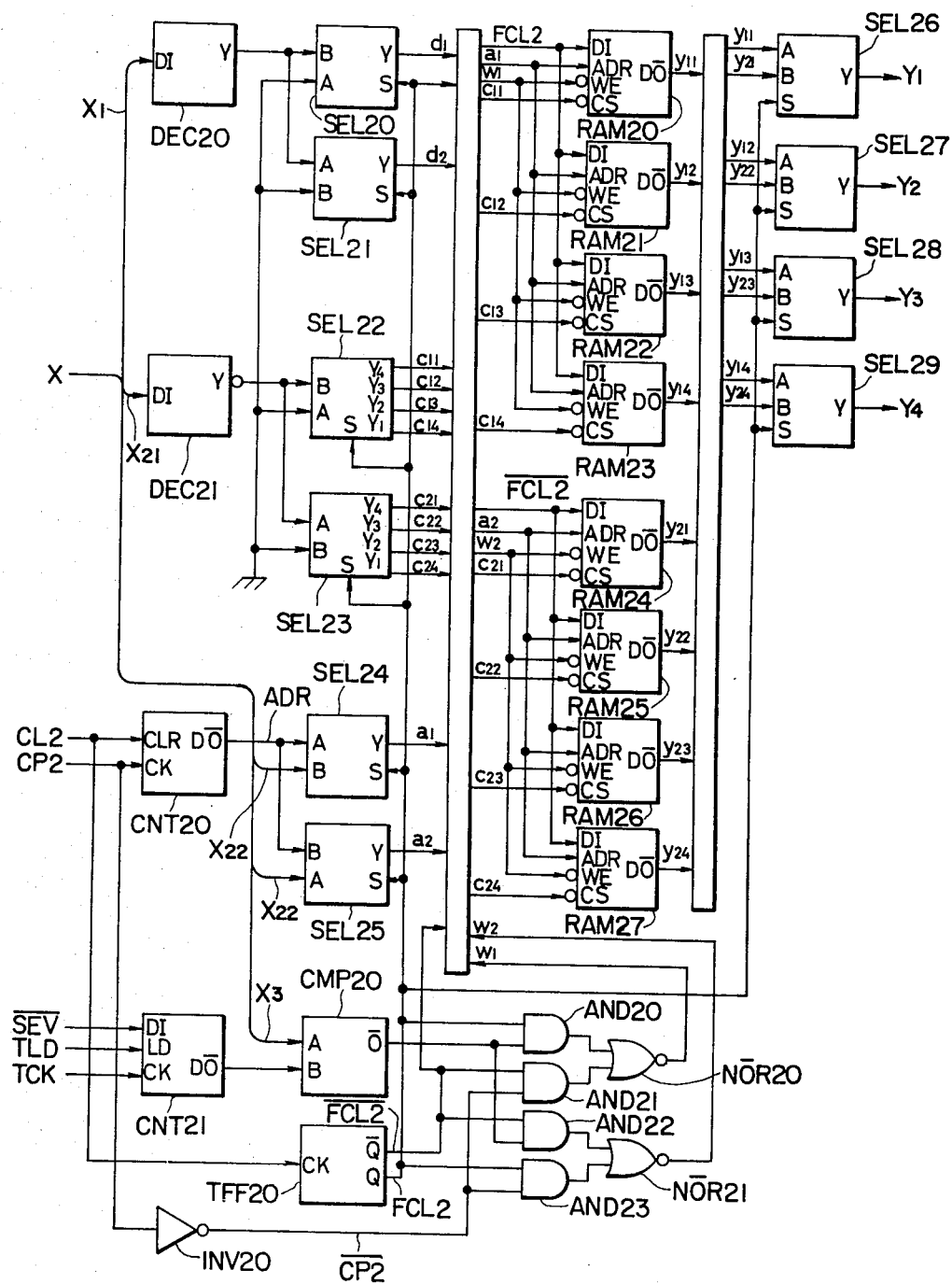
Figure 3:
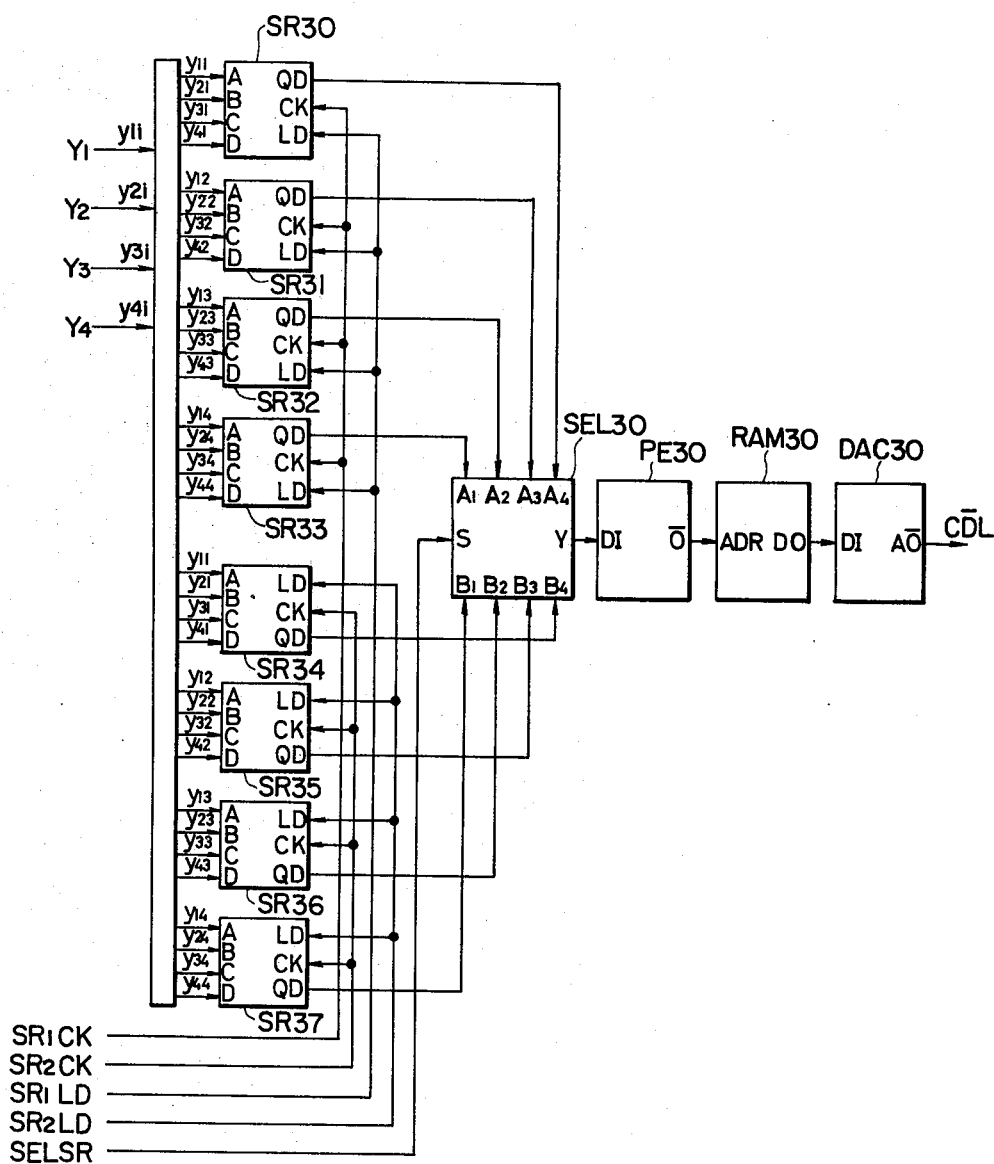
Figure 4:
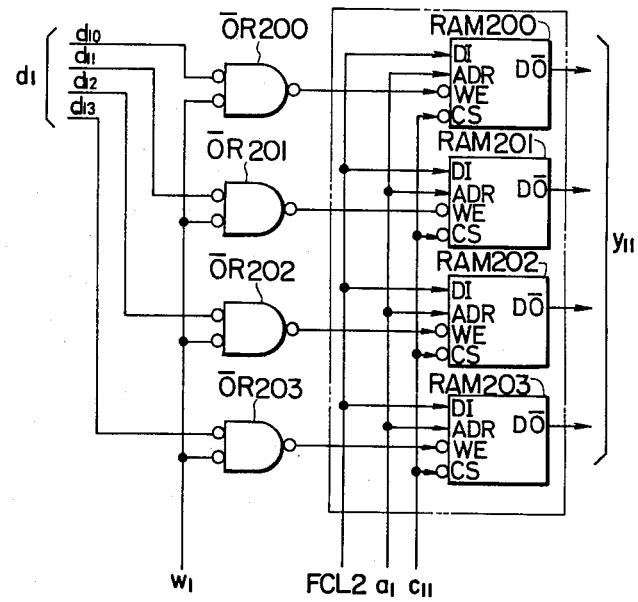
FIG. 4 is also a block diagram but shows the construction of a random access memory of FIG. 2.

FIGS. 2 to 4 are block diagrams showing the constructions of the circuits for assigning the dot information X, which is read out of the memory RAM 11 or 12 of FIG. 1, in memory RAMs 20 to 23 or 24 to 25 of one horizontal scanning line. The operations of those circuits will be described in the following with reference to FIGS. 6 and 8.

Although each of the memory RAMs 20 to 27 shown in FIG. 2 is composed of four RAMs of 1 bit×256 words (e.g., the memory RAM 20 is composed of memories RAMs 200 to 203), as shown in FIG. 4, these four memory RAMs are illustrated in the form of one memory RAM with a view to simplifying the description relating to FIG. 2. Those four memory RAMs 200 to 203 correspond to the names, i.e., the four separate colors, respectively. The four memory RAMs 20 to 23 or memory RAMs 24 to 27 provide the storage location of the dot information [{(1 color×256)×4{×4 words]. In response to the outputs Q and $\overline{Q}$ of the flip-flop 20, for each horizontal scanning period, the memory RAMs 20 to 23 or memory RAMs 24 to 27 are used in an interchangeable manner among the writing operation of the dot information located from the memory RAM 11 or 12, the reading operation for the display and the subsequent erasure. If, for instance, the output signal FCL 2 of the flip-flop TFF 20 assumes the value "1" during a horizontal scanning period, the dot information to be selected from the dot information X and displayed during the next one horizontal period is written in the memory RAMs 20 to 23, and the storage written during the one previous horizontal scanning period is read out of the memory RAMs 24 to 27 so that it is displayed and erased. During the next horizontal scanning period, the memory RAMs 20 to 23 are used for the reading and erasing operations, whereas the memory RAMs 24 to 27 are used for the writing operation.

Now, the writing operations of a certain dot information in the memory RAMs will be described hereinafter. An example is taken for the case, in which the signal FLC2 assumes the level "1." As shown in FIG. 6, the dot information $X_1$ (of two bits) of the dot information X is decoded by means of a decoder DEC 20 and is fed as a data input $d_1$ to the memory RAMS 20 to 23. The data $d_1$ thus decoded are composed of four bits, as indicated at $d_{10}$ to $d_{13}$ in FIG. 4, and "and" is taken between the signal $2_1$ and each of the data $d_{10}$ to $d_{13}$ to determine which write enable terminal WE of the memory RAMs (i.e., the four RAMs 200 to 203) corresponding to the figure names or colors should assume the level "0." Among the data X, the lower two bits ($X_{21}$) of the coordinate value in the horizontal (Y) direction, i.e., in the horizontal scanning direction are decoded by a decoder DEC 21, the output of which is fed to the chip select terminals CS ($C_{11}$ to $C_{14}$) of the respective memory RAMs 20 to 23. More specifically, if the lower two bits of the coordinate value in the Y direction assume "00," the memory RAM 23 is selected, whereas if they assume "01," the memory RAM 22 is selected, and so forth. Among the dot information X, the upper eight bits ($X_{22}$) of the coordinate value in the Y direction are fed as address inputs ($a_1$) to the memory RAMs 20 to 23.

Among the dot information X, the nine bits ($X_3$) of the coordinate value in the vertical (T) direction are fed to the data input terminal A of the comparator 20. On the other hand, the data input terminal B of the comparator 20 is supplied with the output D0 of a counter CNT 21 so that this comparator CMO 20 generates a signal from its output terminal O for A=B, whereby a write signal $w_1$ is generated. At this time, the counter CNT 21 is at the head of the field (Since, in reality, the blanking period is continued from the vertical scanning operation to the 20th horizontal scanning period, this horizontal period becomes the head. On the other hand, the display is performed at the 21th horizontal scanning operation.) so that the value "0" is loaded for the even field whereas the value "1" is loaded for the odd field in response to a signal DLD. After that, in response to the signal TCK, every two count-ups are effected for each horizontal scanning period. More specifically, the output data DO of the counter CNT 21 are varied, during each horizontal scanning period, 0, 2, 4 - - - 510 for the even field and 1, 3, 5 - - - 511 for the odd field so that the timely position of the scanning line on the television resorting to the interlace system is made to correspond to the coordinate value on the television.

As has been described with reference to FIG. 1, on the other hand, the dot information X is read out of the memory RAM 11 or 12 repeatedly for each time H the number of the dots (or 512 at the maximum) to be displayed in the frame under consideration for the period of 100 n secs (the clock pulses of 10 MHz). As a result, for the dot information in which the output data DO of the counter CNT 21 become coincident with the coordinate value $X_3$ in the vertical direction, the information based on the name of the information $X_1$ is written within one horizontal scanning period in such an address of the memory RAM designated by the information $X_{21}$ as is designated by the information $X_{22}$.

Figure 9:
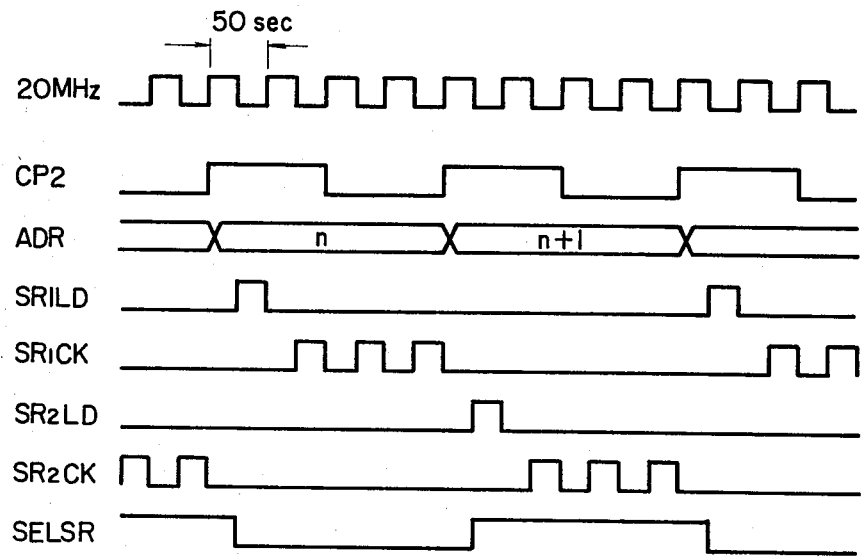
FIGS. 8 and 9 are time charts showing the respective units of the first embodiment shown in FIGS. 1 to 3.
Figure 8:
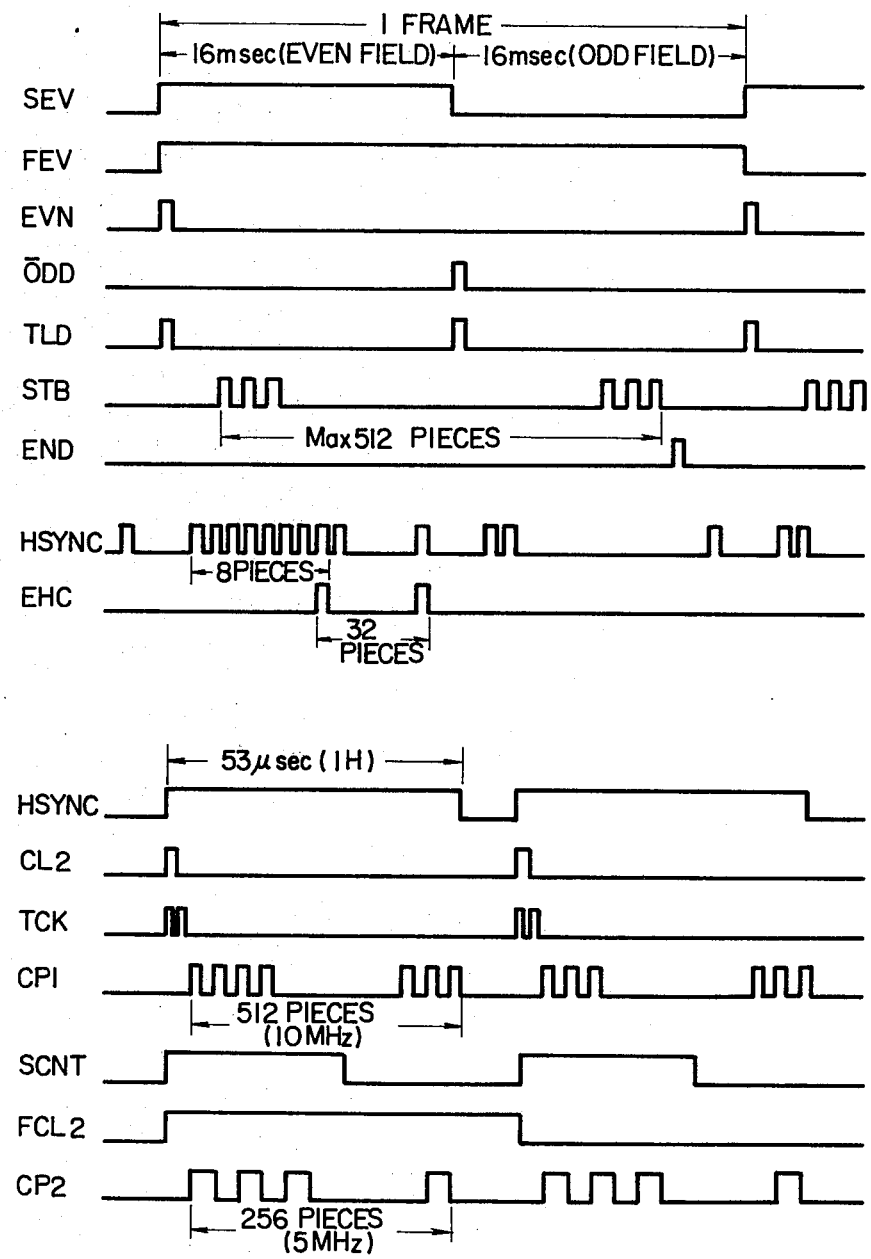

Now, with reference to the block diagrams showing the displaying circuits in FIGS. 2, 3 and 4, the timing chart of FIG. 8, and the timing chart of FIG. 9, the reading operations of the data out of the memory RAMs 20 to 23 or memory RAMs 24 to 27 as well as the displaying and erasing operations of the same. By way of example only, the case, in which the signal FCL 2 assumes the value "0," will be described.

As shown in FIG. 9, the signals CP 2, SR1Ld, SR1CK, SR2LD, SR2CK and SELSR of 5 MHz (wherein the period is 200 n secs corresponding to the scanning period of four picture elements) are generated on the basis of the clock pulses of 20 MHz (wherein the period corresponds to the canning period of one picture elements).

The counter CNT for the address ADR designation of the memories 20 to 23 is cleared by the signal CL 2 at the beginning of the signal HSYNC. In response to the output of the flip-flop TFF 20, during one horizontal scanning period, the data input terminals DI of the memory RAMs 20 to 23 are supplied with the level "0" as the data for the erasing operation, whereas the chip select terminals CS of the same memory RAMs 20 to 23 are supplied with the level "0." The counter 20 is counted up in response to the signal CP 2 so that the data output DO of the designated address of the memory RAMs 20 to 23 is fed through the selectors SELs 26 to 29 to the shift register SRs 30 to 33 or SRs 24 to 27. In other words, when the signal SELSR is at the level "0," the signal SR1LD is generated so that the SRs 30 to 33 are loaded with the dot information. In response to the signal SR1CK, moreover, the information corresponding to the four picture elements is read out each 50 n secs in a time serial manner and is fed through the selector SEL 30 to a priority encoder PE 30.

Moreover, after the shift registers SRs 30 to 33 are loaded with the output data DO of the memory RAMs 20 to 23, the signal FCL 2 assumes the value "0." As a result, the selector SEL 20 generates at the Y terminal the value of the terminal A, i.e., "0" thereby to reduce all the signals $D_{10}$ to $d_{13}$ to the level "0." In response to both this and the output $\overline{CP\,2}$ of an inverter INV 20, the level "0" is fed from the resultant signal $w_1$ to the write enable terminals WE of the memory RAMs 20 to 23 and is written as the data to effect the erasing operation.

Then, the counter CNT 20 is operated in response to the signal CP 2, and the next addresses ADRs of the memory RAMs 20 to 23 are designated so that the data corresponding to the four picture elements are read out of the memory RAMs 20 to 23, fed to the shift registers SR 34 to 37 and likewise supplied to the encoder 30 by the same operations as those of the previous ones. These operations are repeated to read out all of the storages from 0th to 255th addresses of the memory RAMs 20 to 23, thus completing the one horizontal scanning period.

In FIG. 3, incidentally, the encoder PE 30 determines the priority order of the inputs DI thereby to designate the address of the memory RAM 30 which is stored with the three bits of the color information (or totally nine bits) indicative of the red, blue and green colors for the respective names. [A number of colors can be prepared by setting the ratio of those three primary colors. For instance, in case the name "01" is given assuming that the color for the name "01" is crimson, it is also assumed that such information as the three bits of the red is (111) whereas the three bits of the blue and green are (000) is stored in the memory RAM 30.] In FIG. 7, for example, the input and output terminals of the selectors SEL 26 to 29, the shift registers SEL 30 to 37 and the selector SEL 30 are so connected that the tower light has the highest display priority, which is named "11," and that the output data bits of the memory RAMs 20 to 27 corresponding to the name "11" are connected with the input terminal of the encoder PE 30 having the highest priority order.

The description of the first embodiment of the present invention shown in FIGS. 1 to 4 has just been finished. Another embodiment of the present invention will be described in the following.

Figure 5:
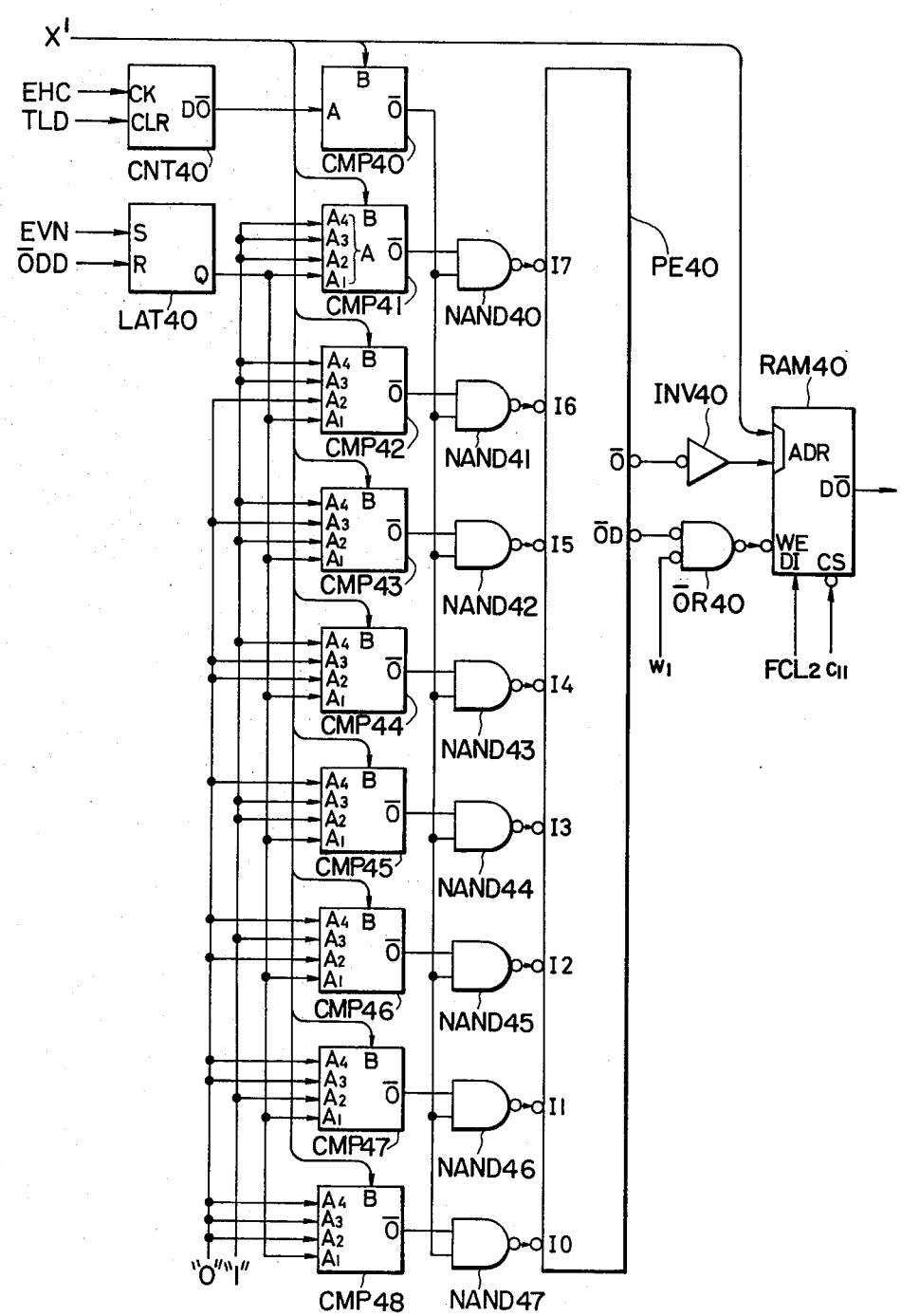
FIG. 5 is also a block diagram but shows the control unit of another embodiment of the figure displaying device according to the present invention.

The construction of the control unit of the embodiment, in which the maximum number of dots to be displayed on one television screen is 4000, is shown in FIG. 5. As the number of the dots to be displayed is increased, the assignment of the dot information from the memories RAMs 11 to 12 to the memories RAMs 20 to 27 is not completed for one horizontal scanning period but for eight horizontal scanning periods. In place of the memory RAMs 20 to 27 for storing the information corresponding to the one horizontal scanning line, therefore, there are provided memory RAMs 40 to 47 corresponding to eight scanning lines (In this embodiment, as the memory RAMs 200 to 203 are represented by the memory RAM 20 in the first embodiment, the four memory RAMs 40 to 48 having the actual construction of 1 bit × 2048 words are represented by the single memory RAM. Therefore, the memory RAMs 41 to 47 are omitted from FIG. 5.) so that the assignment of the dot information is accomplished while using the eight horizontal scanning periods as a unit.

More specifically, the data input terminals A (wherein A1 to A4 correspond to the respective bits of the four bits of the binary notation such that A4 indicates the highest unit whereas A1 indicates the lowest unit) of the comparators CMP 41 to 48 are supplied always for the even field with 0, 2, 4, 6, 8, 10, 12 and 14 in the decimal notation and for the odd field with 1, 3, 5, 7, 9, 11, 13 and 15. As a result, the input terminal A of the comparators CMP 40 is varied during one field for the eight horizontal scanning periods in a manner of 0, 1, 2, 3, - - -, 32.

On the other hand, the input terminals B of the comparators CMP 41 to 48 are supplied with the four lower bits (i.e., 0th to third bits in FIG. 6) of the coordinate values in the T direction whereas the input terminal B of the comparator 40 is supplied with the five upper bits (i.e., 4th to 8th bits in FIG. 6) of the coordinate value in the T direction.

Moreover, the coincidence between the value of the scanning position having the eight horizontal scanning line width and the corodinate value of the nine bits in the T direction is taken by means of NAND gates 40 to 47 and is fed to the priority encoder PE 40. This encoder 40 generates at its output terminal O the three bits output corresponding to the eight inputs of the input terminals I0 to I7.

Figure 10:
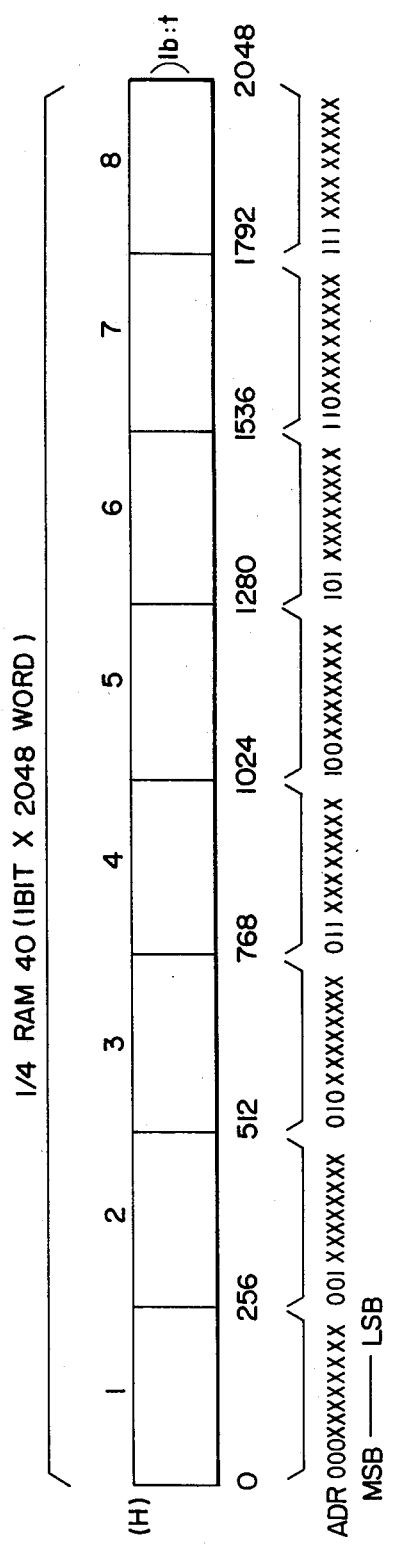
FIG. 10 is a diagrammatical view showing the address designated condition of the random access memory of the second embodiment of FIG. 5.

For example, the output of "000" is generated in case there is an output at the input terminal IO whereas the output "001" is generated in case there is an output at the input terminal 11. The output of the encoder PE 40 is fed to the upper three bits of the address terminals of the memory RAMs 40 to 43 or RAMs 44 to 47. On the other hand, the lower eight bits of the address terminals of those memories are fed to the upper eight bits of the coordinate values of the dots in the Y direction. The condition, under which the addresses are designated in the memory RAM 40, is shown in FIG. 10.

If there is any dot to be displayed during the first horizontal scanning period of the subsequent eight periods after assignment completion, the three upper bits of the address terminals ADR of those memory RAMs are indicated at "000" whereas the three upper bits are indicated at "001" for the dot to be displayed during the second horizontal scanning period so that the dot information is written in a preset address in a similar manner in FIG. 2.

The reading operations for the display are performed in a similar manner to those of FIG. 2, but the clearing operations of the counter CNT 20 is accomplished every eight horizontal scanning periods so that the output thereof is varied from 0 to 2047.

Finally, the reduction coefficient of the number of the necessary bits of the random access memories according to the present invention will be described in the following.

First, in the embodiment shown in FIGS. 1 to 4, i.e., in the case the dots of the four separate colors having nine bits of color information are displayed 512 at the maximum per screen in the television having resolution of $$1024 \times 512,$$
$$2 \times (21 \times 512)$$
$$+ 2 \times (4 \times (4 \times 256))$$
$$+ 4 \times 9$$
$$= 29732 \text{ (bits)}.$$

Next, in the embodiment shown in FIG. 5, i.e., in case the similar dots to those of the foregoing embodiment are displayed 4096 at the maximum per screen, $$2 \times (21 \times 4096)$$
$$+ 2 \times (4 \times (4 \times 2048))$$
$$+ 4 \times 9$$
$$= 237604 \text{ (bits)}.$$

In the so-called "frame memory system" according to the prior art, on the other hand, the following number of the bits is required.

$$2 \times (1024 \times 512 \times 9)$$

-continued
$$= 9437184 \text{ (bits)}.$$

The reduction percentage of the first embodiment shown in FIGS. 1 to 4 can be expressed:

$$\frac{29732}{9437184} \times 100 = 0.3. (\%).$$

The reduction percentage of the second embodiment shown in FIG. 5 can also be expressed:

$$\frac{237604}{9437184} \times 100 = 2.51 (\%).$$

What is claimed is:

1. A figure displaying device for displaying a figure on the screen of a raster scan television in accordance with a plurality of dots, comprising: first memory means for storing dot information indicative of the ordinate and abscissa values of the respective dots on said screen; second memory means for storing preset information in a designated address by using the abscissa value of said dot information as an address; first control means for locating the dot information having the desired ordinate value from said first memory means so that the preset information may be stored in the address of said second memory means corresponding to the abscissa value of the dot information located; and second control means for sequentially reading out the information stored in said second memory means in accordance with the scanning operation of said screen so that the figure may be displayed on said screen in accordance with the information read out.

2. A figure displaying device for displaying a figure on the screen of a raster scan television in accordance with a plurality of dots, comprising: first memory means for storing dot information indicative of the displayed conditions of respective dots and the ordinate and abscissa values of the same on said screen; second memory means provided for each of said displayed conditions for storing preset information in a designated address by using the abscissa value of said dot information as an address; first control means for locating the dot information having the desired ordinate value from said first memory means so that the preset information may be stored in such an address of said second memory means corresponding to the displayed condition of the dot information located as corresponds to the abscissa value of said dot information; and second control means for sequentially reading out the respective information stored in said second memory means in accordance with the scanning operation of said screen so that the figure may be displayed on said screen in accordance with the information read out.

3. A figure displaying device according to claim 1 or 2, further comprising third memory means for storing the number of pieces of the dot information which is stored in said first memory means, wherein said first control means is made operative to restrict the number of the locations of the coordinate values, which are stored in said first memory means, in accordance with the storage of said third memory means.

4. A figure displaying device according to claim 2, wherein said second control means is made operative to select any of the storage of said second memory means, which are sequentially read out in accordance with the scanning operation of said screen, in accordance with a preset priority so that the display may be effected on said screen in accordance with the storage selected.

* * * * *